United States Patent [19]

Craft

[11] 4,044,907
[45] Aug. 30, 1977

[54] HAY HANDLER

[76] Inventor: Carl R. Craft, Rte. 1, Box 15, Kempner, Tex. 76539

[21] Appl. No.: 680,158

[22] Filed: Apr. 26, 1976

[51] Int. Cl.² ............................................. B60P 1/04
[52] U.S. Cl. ............................... 214/506; 214/85.5; 214/DIG. 4
[58] Field of Search ................. 214/506, 85.5, DIG. 4

[56] References Cited

U.S. PATENT DOCUMENTS

| | | | |
|---|---|---|---|
| 2,547,601 | 4/1951 | Scheirer | 214/85.5 |
| 3,086,666 | 4/1963 | Larson | 214/85.85 |
| 3,896,956 | 7/1975 | Hostetler | 214/DIG. 4 |
| 3,944,095 | 3/1976 | Brown | 214/506 |

Primary Examiner—Robert J. Spar
Assistant Examiner—Lawrence E. Williams
Attorney, Agent, or Firm—Marcus L. Bates

[57] ABSTRACT

Hay handling apparatus by which a large, cylindrical bale of hay can be lifted, transported, and deposited, comprising a cradle of a configuration for receiving the bale therewithin. A main frame pivotally supports the cradle so that the cradle can be pivoted from superimposed relationship respective to the frame into contact with the surface of the ground, whereupon the main frame can be forced towards the bale of hay. A cable means is next placed about the bale of hay and winched towards the main frame, whereupon the bale of hay enters the cradle and the cradle is forced to pivot over the center of gravity and into superimposed, supported relationship respective to the main frame.

14 Claims, 12 Drawing Figures

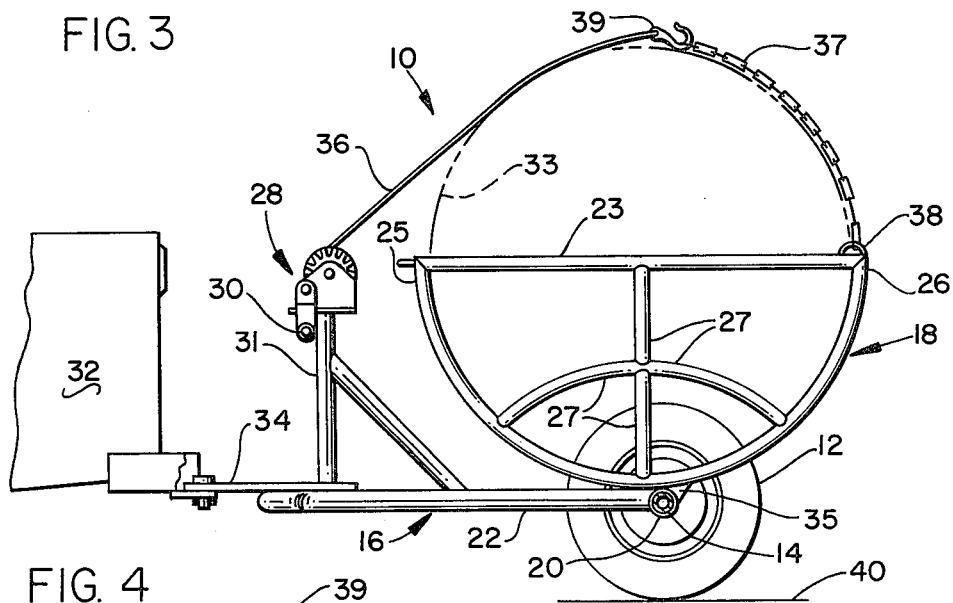
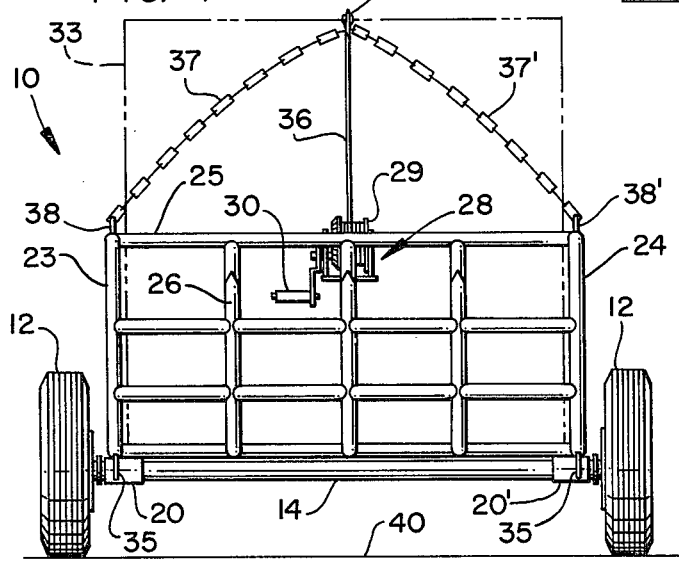
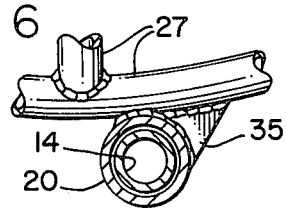
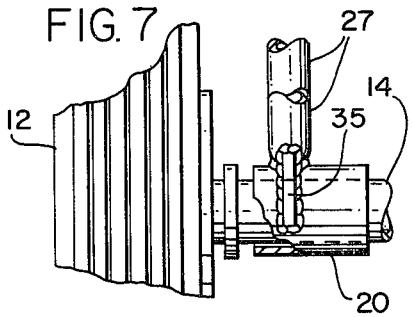
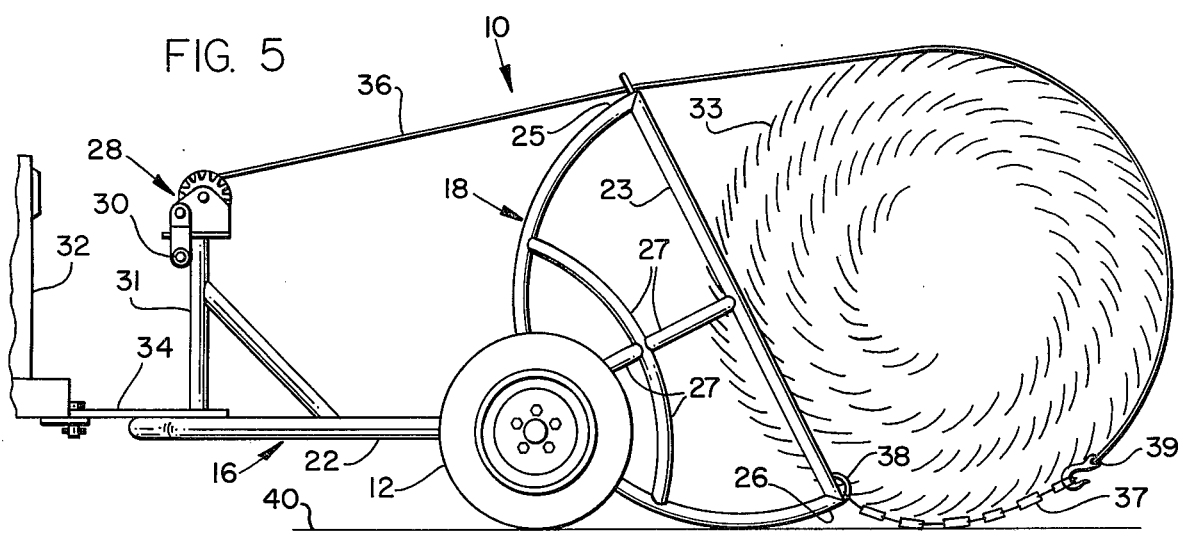

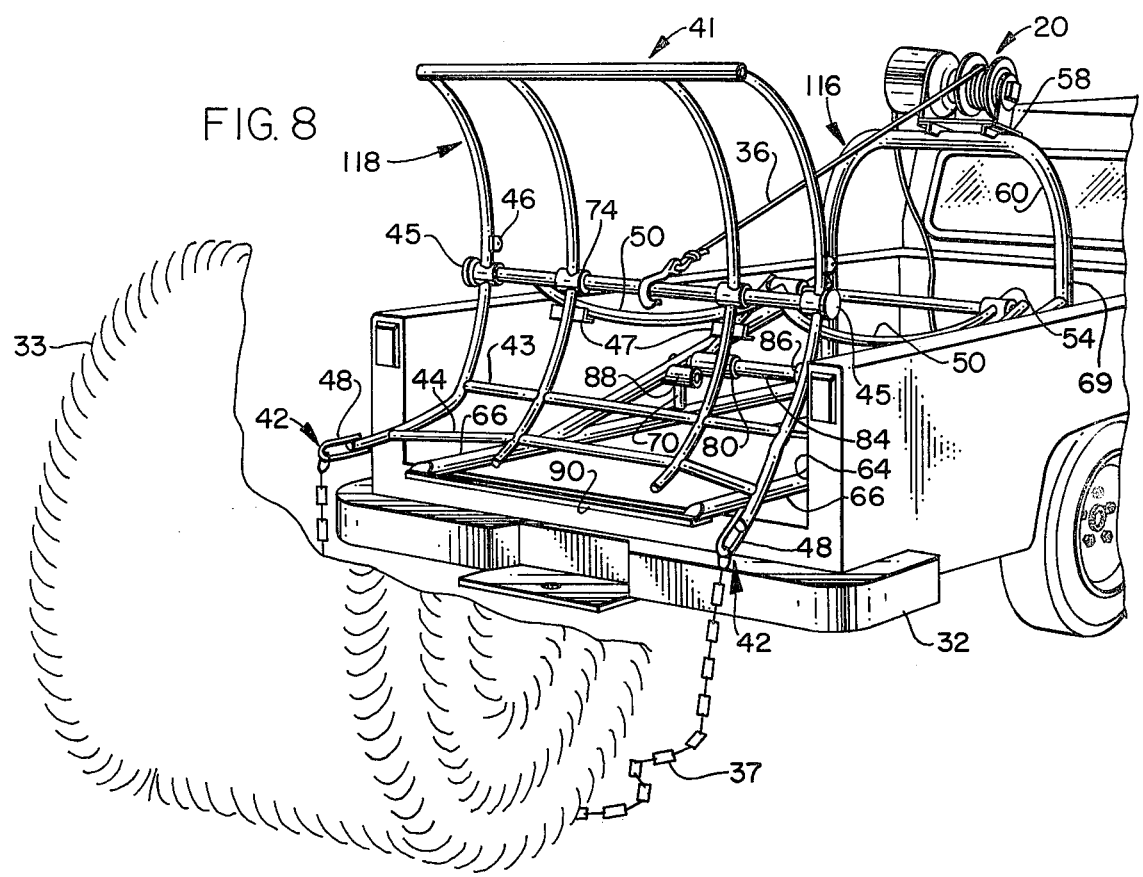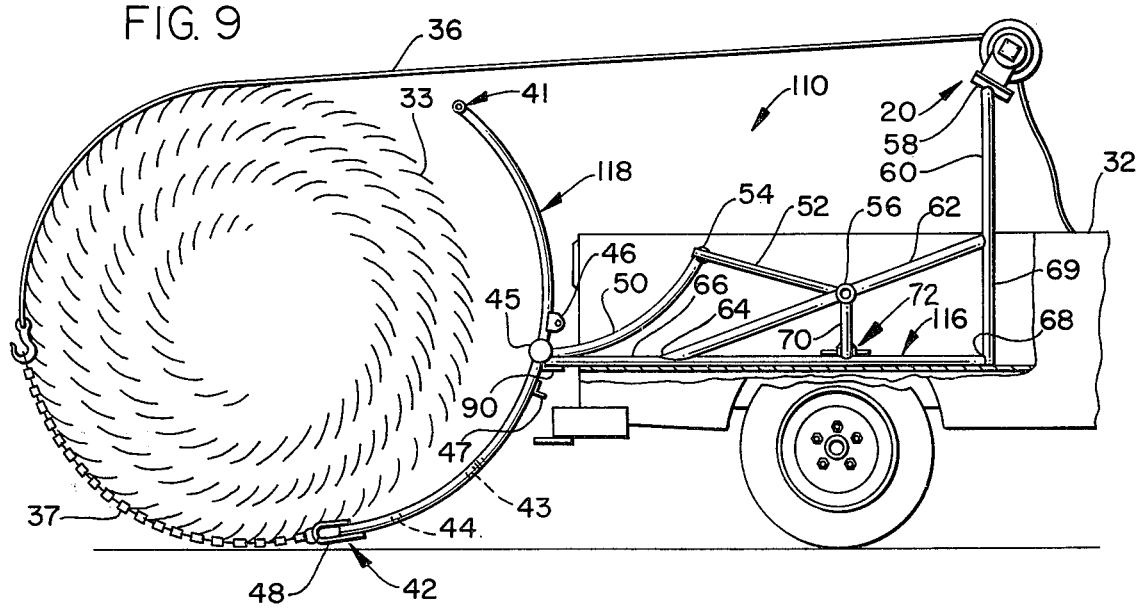

HAY HANDLER

BACKGROUND OF THE INVENTION

Farm laborers continually decline in population as the cost thereof escalates. In order to overcome the cost involved in raising and handling hay, it has become necessary for the farmer to employ new hay baling apparatus which bales the hay into very large, cylindrical bales, rather than the conventional square or rectangular bale of hay.

It is impossible for an individual person to lift and move the large, cylindrical bale of hay from one location to another, and for this reason, various mechanical expedients have been proposed to accomplish this task, as exemplified by the patent to Hostetler, U.S. Pat. No. 3,896,956. Reference is also made to Edelman, U.S. Pat. No. 3,877,595 and Larson, U.S. Pat. No. 3,086,666, which are examples of the prior art wherein various mechanical expedients are employed for moving heavy, elongated loads of material.

These and other known prior art expedients, which may be employed for movement of large objects, such as a cylindrical bale of hay, are complicated and high in initial cost. Furthermore, these prior art devices lack the utility required by the small hay farmer. Accordingly, it would be desirable to have a hay handling apparatus by which large, cylindrical bales of hay can be lifted and transported by one person. Furthermore, it would be desirable if the improved apparatus could be removably mounted within the bed of an ordinary pickup truck, or alternatively, it could be trailer mounted so that the additional advantage of leaving the last bale of hay within the trailer-mounted hay handling apparatus could be realized for feeding cattle directly from the apparatus.

SUMMARY OF THE INVENTION

Hay loading and transporting apparatus comprising a main frame to which an upwardly opening, elongated, segmented, cylindrical cradle is pivotally mounted in such a manner that the cradle can be extended in a pivotal manner respective to the frame and into proximity of the ground for receiving a large, cylindrical bale of hay therewithin, and thereafter retracted into supported relationship respective to the main frame.

The cradle preferably is an open framework, having a leading edge spaced from a rear edge. A winch has a cable means rove thereabout and extended into proximity of the rear edge of the cradle so that the cable can be forced under the bale of hay, the hay winched into the cradle, and the cradle thereafter winched into retracted position.

The cradle is journaled to the main frame at an off-center location underlying the cradle and overlying the main frame such that the cradle pivots from the retracted into the extended position, and vice versa, with an over-the-center movement.

In one embodiment of the invention, the cradle is directly pivoted to a transverse member of the frame. In another embodiment, the cradle is journaled to the frame member by a spaced, scissors-like mechanism which enables the cradle to be positioned upon the main frame such that the center of gravity of the entire apparatus is more compatible with the load-carrying capabilities of an ordinary pickup truck.

Accordingly, a primary object of the present invention is the provision of hay loading and transporting apparatus which is easily operable by a single individual.

Another object of the invention is to provide improvements in hay loading and transporting apparatus comprising a cradle mounted to a main framework with an over-the-center action so that the bale of hay can be placed within the cradle and the cradle thereafter rotated into superimposed relationship respective to the main framework, such that the center of gravity of the cradle causes the bale of hay to be properly supported respective to the main frame.

A further object of this invention is the provision of hay handling apparatus by which a large, cylindrical bale of hay can be lifted, transported, and deposited in a new and unusual manner.

A still further object of this invention is the provision of hay handling apparatus by which large, cylindrical bales of hay can be rolled into a cradle apparatus and the cradle apparatus thereafter pivoted with an over-the-center action into a retracted position, whereupon gravitational forces maintain the bale of hay and cradle supported above the main framework until the bale of hay is discharged therefrom.

Another and still further object of the present invention is the provision of improvements in hay handling apparatus by which an ordinary pickup truck can be utilized in transporting large bales of hay from one location to another.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 3 is a part cross-sectional side view taken along line 3—3 of FIG. 2;

FIG. 4 is an end view of the hay loading and transporting apparatus disclosed in the foregoing figures;

FIG. 5 is a side elevational view such as disclosed in FIG. 3, with the apparatus being illustrated in an extended configuration;

FIG. 6 is an enlarged, fragmentary, part cross-sectional view of part of the apparatus disclosed in some of the foregoing figures;

FIG. 7 is an enlarged, fragmentary, part cross-sectional view of part of the apparatus disclosed in some of the foregoing figures;

FIG. 8 is a perspective view of a second embodiment of a hay loading and transporting apparatus of the present invention with some additional parts being disclosed fragmentally;

FIG. 9 is a side view of the apparatus disclosed in FIG. 8;

DETAILED DESCRIPTION OF THE PREFERRED EMBODIMENT

Figure 1:
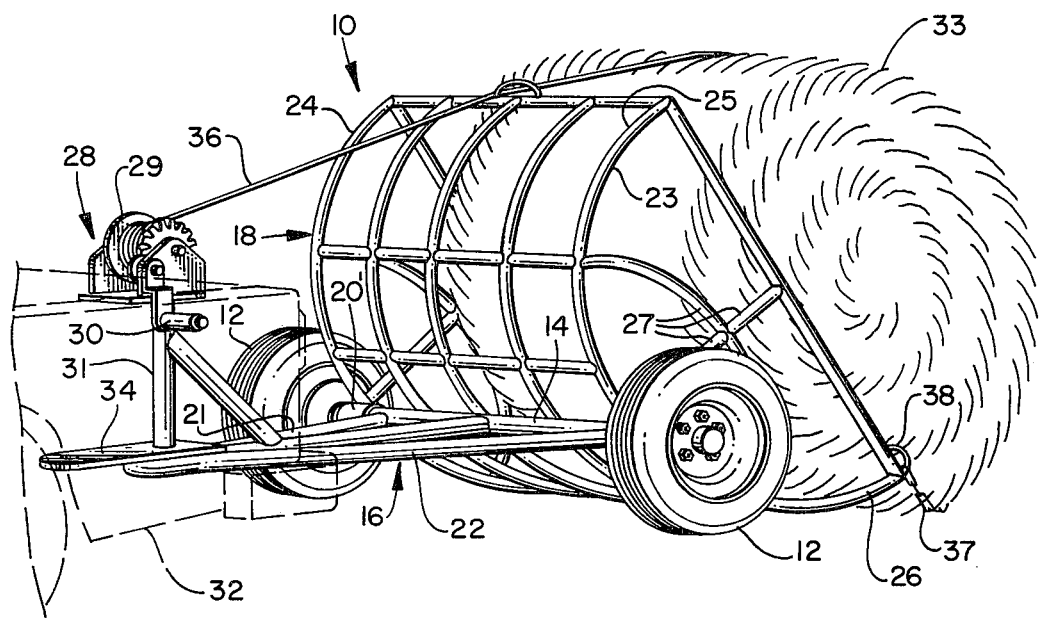
FIG. 1 is a perspective view of a hay loading and transporting apparatus made in accordance with the present invention, with extraneous prime mover apparatus being fragmentally included in dashed lines.
Figure 2:
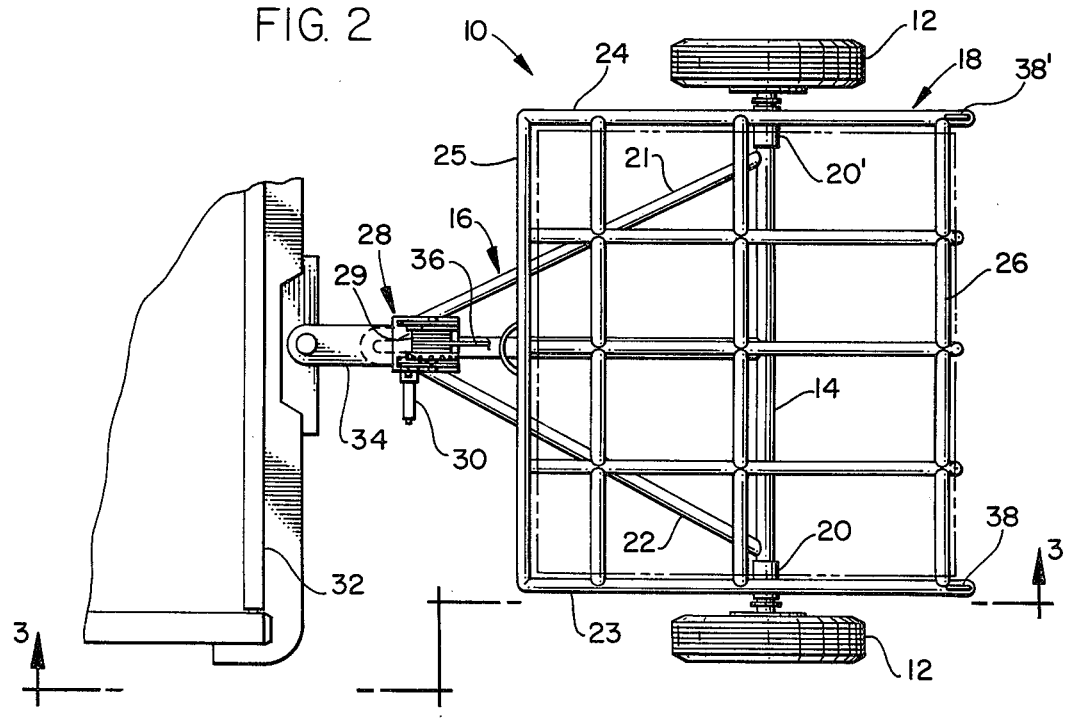
FIG. 2 is a top plan view of the apparatus disclosed in FIG. 1, with some additional extraneous matter being included in a fragmentary representation by dashed lines.

FIGS. 1–7 disclose the first embodiment of the invention wherein a hay loading and transporting apparatus 10 is illustrated. The apparatus is in the form of a cart having tires and wheels 12 journaled to an axle 14, with the axle being affixed to a main frame 16. The main frame pivotally supports a hay receiving cradle 18 and includes spaced, elongated side members 21 and 22. The cradle is in the form of an upwardly opening, elongated, segmented, cylindrical, open framework having sides 23 and 24, a leading edge at 25 spaced from a rear edge at 26. Numeral 27 illustrates the numbers which make up the open framework of side 23, for example.

A winch means 28 is forwardly positioned respective to the main frame and includes a drum 29. Handle 30 rotates the drum, while a trunion 31 supports the winch in a rigid manner from the main frame.

The main frame can be attached to a number of different automotive-type vehicles, such as a pickup truck 32; and therefore, the frame terminates in a forward direction in a trailer hitch 34. Numeral 33 schematically indicates a large, cylindrical bale of hay, which generally is made of a size equivalent to about 20 conventional square bales of hay.

As best seen illustrated in FIGS. 6 and 7, in conjunction with FIGS. 3 and 4, the cradle is journaled to transverse member 14 by means of sleeve 20 and web member 35 and forms a mount means between the cradle and member 14 such that members 14 and 20 cooperate together to enable the cradle to be pivoted with an over-the-center action from the illustrated retracted position of FIG. 3 into the illustrated extended position of FIG. 5.

Cable 36 has one end thereof roved about the drum of the winch 28, with the remaining end thereof being affixed to to anchor 38. As seen illustrated in FIG. 4, spaced anchors 38, 38' are provided at the rear edge of the cradle, with the cable terminating in the form of a bridle 37, 37', having the terminal ends thereof affixed to the anchors. The term "cable means" is intended to include both the wire rope 36, as well as the chain bridle 37. Hook 39 engages a medial portion of the bridle for a purpose which will be better understood later on in this disclosure.

When handling large, heavy bales of hay, it is advantageous to extend the cable 36 under the forward or leading edge of the cradle rather than over the member as shown in FIGS. 3 and 5.

The cart is seen to be supported from the ground 40. When the cradle is in the retracted configuration of FIG. 3, it is continually biased into the retracted position because gravity urges continual motion of the cradle once it passes over the center of gravity. The center of gravity of the cradle is therefore forwardly positioned ahead of the journal means 20. When the cradle is in the extended position of FIGS. 1 and 5, the rear edge 26 of the cradle is in close proximity of the ground to facilitate loading the bale 33 thereinto.

In operation of the first embodiment disclosed in FIGS. 1–7, the large, cylindrical bales of hay are left randomly lying about the hay field, and by proper manipulation of the vehicle, cart, and cable, one person can efficiently load the bale of hay, transport the bale to another geographical location, whereupon the bale can then be easily discharged from the cradle. This is preferably carried out by using the vehicle to back the cart into a position illustrated in FIGS. 1 and 5, whereupon a rearward thrust is made so that the bale comes to rest in the position illustrated in FIGS. 1 and 5. The bridle 37 is next attached to the anchors 38, 38', the hook 39 attached to the medial portion of the bridle, and the winch utilized for its mechanical advantage in properly positioning the bale of hay and the cradle into the nested, retracted position seen illustrated in FIGS. 2 and 3. The cart, along with the bale of hay, can be transported to a different geographical location and the bale of hay discharged from the apparatus by merely releasing the bridle portion of the cable means from the hook 39 and rotating the cradle into the configuration of FIG. 3, whereupon the bale of hay will roll from the cradle means. The cradle is then rotated back into its retracted position and the cart returned to the hayfield for another load.

Alternatively, the cart, along with the bale of hay, can be left standing in the feed lot, thereby enabling cattle to directly feed from the cart. This is an important aspect of the invention, and when viewed in this manner, the hay handling apparatus actually becomes a hay loading, transporting, and feeding apparatus.

In the embodiment of the invention disclosed in FIGS. 8–12, apparatus 110; by which a large, cylindrical bale of hay can be lifted and transported; is seen to be removably contained within the bed of an ordinary pickup truck. The hay loader includes a cradle 118 which is in the form of an upwardly opening, elongated segment of a cylinder having a leading edge 41 spaced from a rear edge 42. Transverse members 43 and 44 are located between the forward and rear edge of the cradle.

Journal means 45 pivotally secure the cradle respective to the main frame. Member 46 is in the form of a saddle and is spaced from the two spaced-apart stop members 47, which in turn is spaced from the before mentioned journal means. Spaced-apart anchors 48 are attached to the opposed rear edge of the cradle for engaging the bridle of the cable means.

Strut 50 is curved and includes opposed end portions, one of which is affixed to the cradle by means of journal 45, with the remaining end being affixed to an actuating arm 52 by means of a journal located at 54. Transverse member 56 journals the remaining end of arm 52 to the main frame.

The winch 20 is affixed at 58 to the central portion of an inverted, U-shaped member 60, which defines the forward end of the main framework. The main frame includes member 62, which forms a truss-like structure respective to frame members 64, 66, 68, and 69.

Member 70 aids the support of the truss in proximity of member 56. Screw jack 72 removably affixes the main frame to the bed of the truck by releasably engaging truck structure with frame structure by the male and female parts of the screw jack mechanism, thereby forcing the frames together with sufficient force to prevent relative movement therebetween. Numeral 74 indicates the means by which the cradle is journaled at spaced locations to transverse frame member 76.

Figure 11:
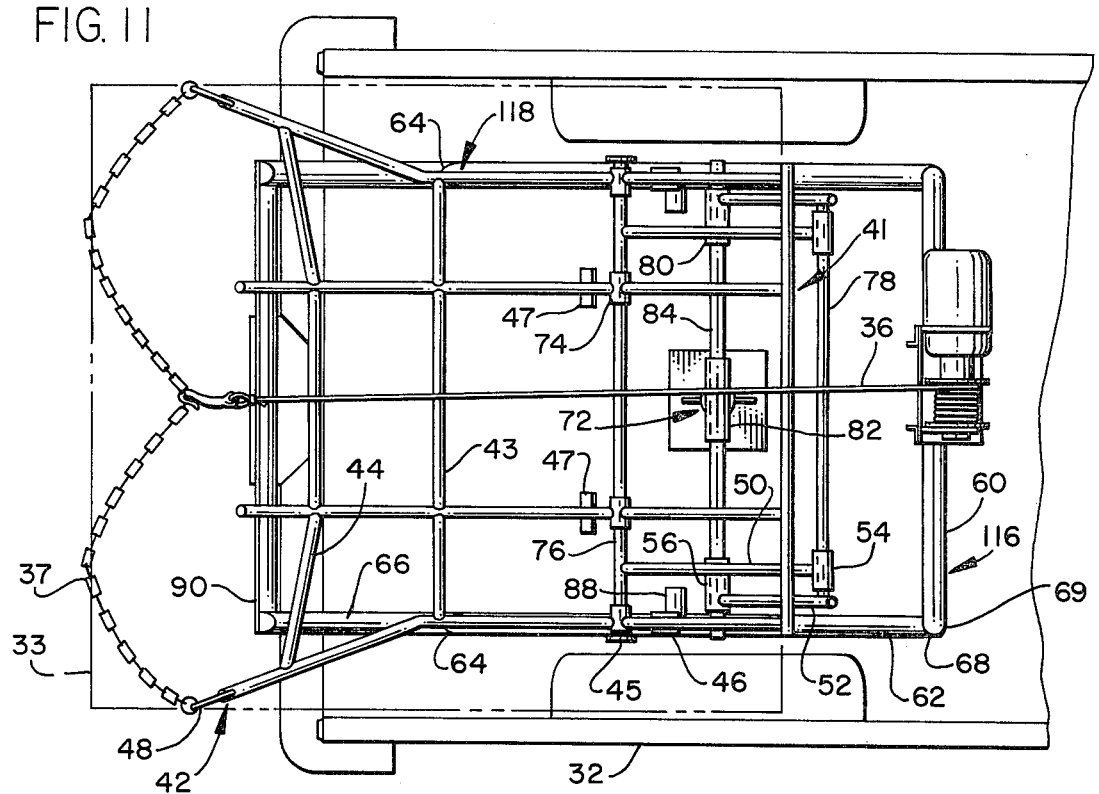
FIG. 11 is a top plan view of the apparatus disclosed in FIG. 10.
Figure 12:
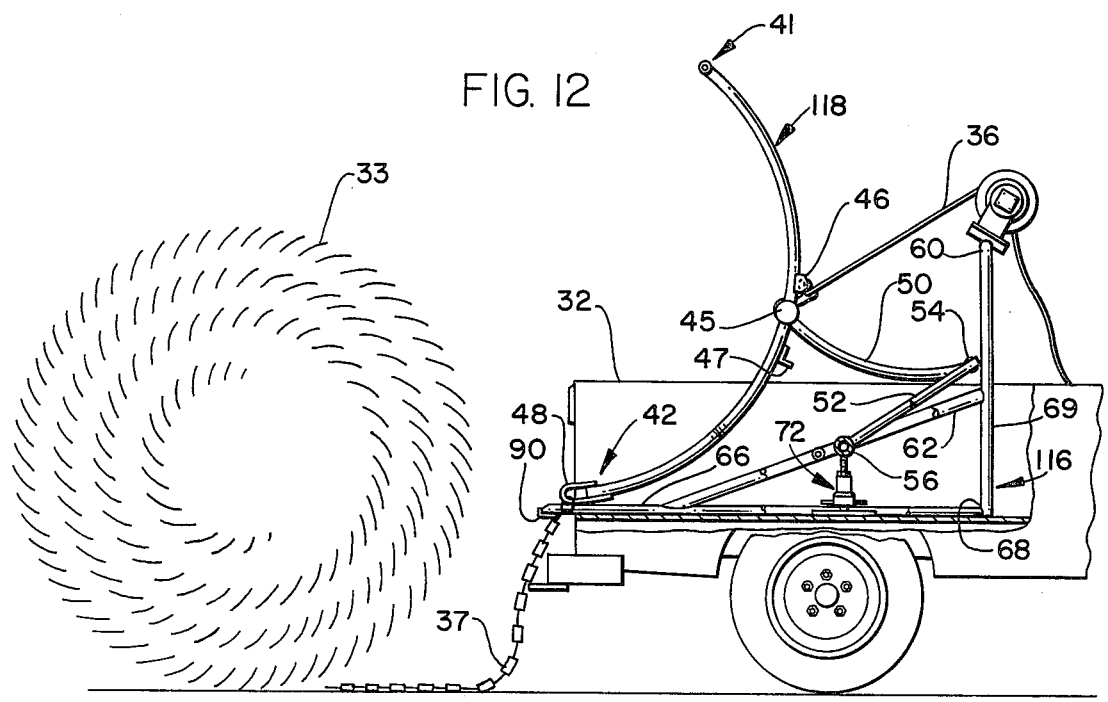
FIG. 12 is similar to the disclosure of FIG. 8, with some parts thereof being broken away therefrom to better disclose the details of the invention.

As best seen illustrated in FIG. 11, member 78 is affixed to member 52 and forms part of the coacting journal means seen at 54. Sleeve 80 is identical to the sleeve 56 and forms a journal respective to transverse member 84. Sleeve 82 forms a jack point by which the screw jack 72 can force member 84 of the main frame towards the truck bed. Member 88 forms a stop respective to member 52 as the cradle is moved into the extended configuration. Member 90 forms the trailing end of the main frame.

Figure 10:
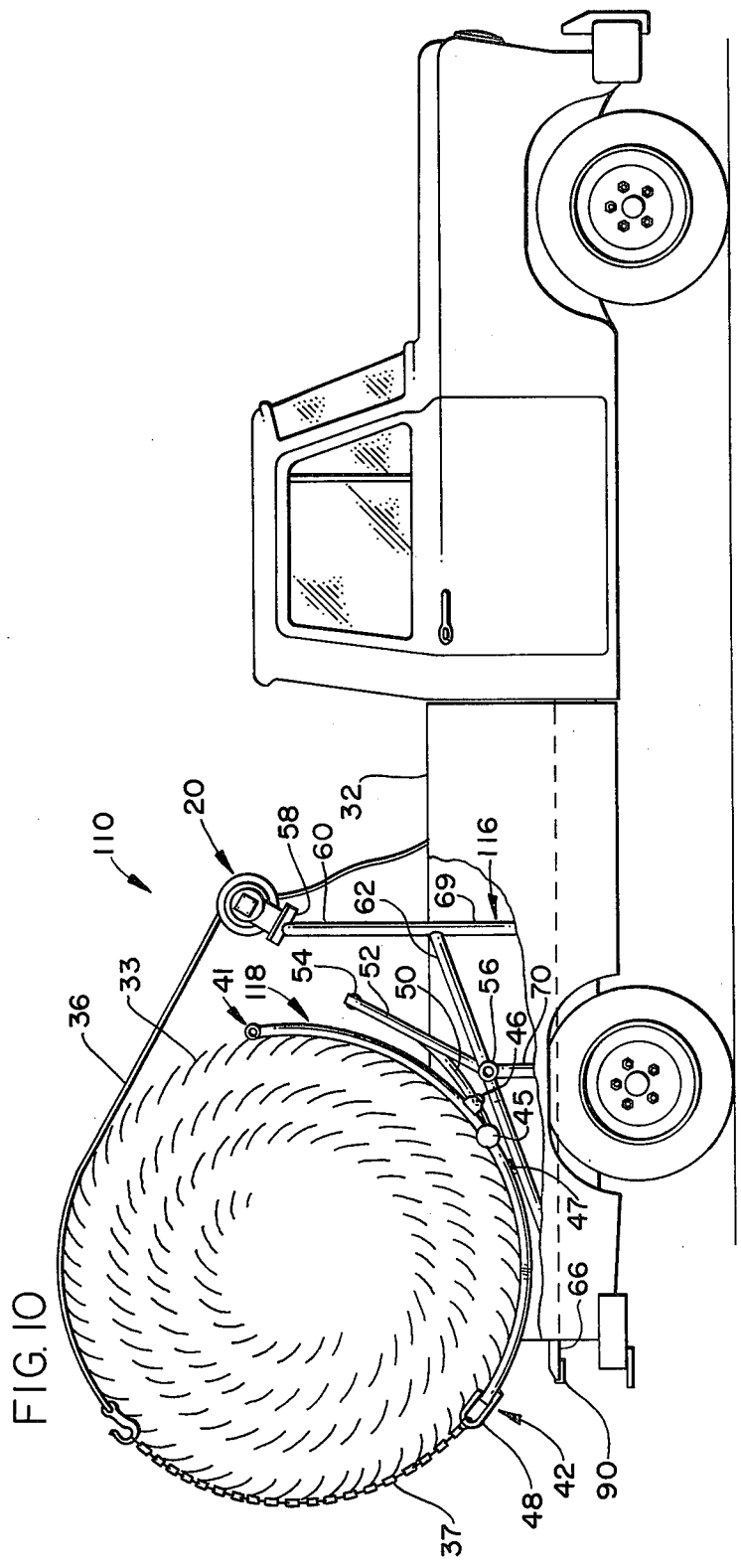
FIG. 10 is similar to FIG. 9, but with the apparatus of the present invention being disclosed in the retracted configuration.

In operation, the apparatus 118 is loaded into the bed of a pickup truck, with the cradle being in the retracted configuration seen illustrated in FIG. 10. The screw jack is utilized to removably attach the entire apparatus to the truck. A bale of hay 33 is loaded onto the truck by extending the scissor members 50, 52 and backing the truck into the bale of hay in the illustrated manner of FIG. 9. During this part of the operation, member 47 will engage member 90 to prevent the cradle from being moved into the retracted position. The bridle portion of the cable means is next placed rearwardly about the bale of hay in the illustrated manner of FIG. 9, and the winch 20 engaged so that the bale of hay rolls into the cradle and the cradle thereafter is retracted up into the pickup body as the arm and strut 50, 52 of the scissor members collapses upon itself into the configuration of FIG. 10.

As best seen illustrated in FIG. 10, the action of the scissors permits the bale of hay to be forwardly located so that the center of gravity of the large bale of hay is positioned between the forward and trailing ends of the main frame and well within the safety limits of the truck.

The bale of hay is unloaded by releasing the tension on cable 36, so that the cradle 118 pivots in a counter-clockwise direction, and at the same time, the scissors are moved apart into the illustrated position of FIG. 9. The hook is removed from the bridle, and one end of the bridle released from one of the anchors, whereupon the bale rolls from the cradle, and the cradle can thereafter be retracted back up into the truck, and the truck sent for another large bale of hay.

In handling large, heavy bales, it is often advantageous to place the cable 36 under member 41, rather than above, as seen in FIG. 10.

I claim:

1. Hay loading and transporting apparatus comprising a main frame having opposed sides, a forward end, and a trailing end;
    a cradle in the form of an upwardly opening, elongated, segment of a cylinder having an open framework and providing a leading edge spaced from a rear edge and opposed end members;
    a winch, a cable means, means by which one end of said cable is attachable to said rear edge, with the remaining marginal cable end being rove about said winch such that the cable is extensible from and movable towards said winch, means mounting said winch in proximity of said forward end of said main frame;
    mount means affixed to said main frame for pivotally supporting said cradle at an off-center location underlying said cradle, said mount means moves said cradle from a retracted position closely adjacent said main frame into an extended position spaced from said main frame with an over-the-center movement to thereby enable said cradle to be extended away from said main frame and pivoted into a position to place a marginal rear edge portion of the cradle at ground level, and the main frame thereafter moved in a direction towards said rear edge in order to engage a bale of hay with said rear edge, a marginal length of said cable can then be forced under the bale, whereupon the cable is then tightened to move the bale of hay into the cradle and thereafter pivotally move the cradle into the retracted position, thereby loading the bale and enabling the bale to be transported to another geographical location.

2. The apparatus of claim 1 wherein spaced anchors are affixed to said rear edge, said cable includes a bridle affixed to said anchors and a line leading to said winch.

3. The apparatus of claim 1 wherein said mount means includes spaced journals mounted to said trailing end of said main frame, means by which an arm is affixed to said cradle at a location spaced from the center of gravity thereof and to said spaced journals; a stop means for limiting the pivotal action of said cradle in a direction towards the forward end of said main frame,
    whereby said cradle, as it pivots about said journal means, must be vertically raised and lowered respective to said main frame.

4. The apparatus of claim 1 wherein said mount means includes an actuating arm, a strut, said strut having one end journaled to said cradle and another end journaled to said actuating arm, one end of said arm being journaled to said main frame; opposed ends of said arm and said strut move towards one another so as to fold together when said cradle is retracted, and fold apart when said cradle is extended respective to said frame, thereby moving said cradle from proximity of said trailing end towards a central overlying position respective to said main frame as said cradle is retracted.

5. The apparatus of claim 4 wherein said strut is curved into a path which is essentially parallel to the curvature of said cradle so that the cradle is nested within the strut when it is retracted.

6. The apparatus of claim 1 wherein said main frame is of a size and configuration to be received within the bed of a pickup truck.

7. The apparatus of claim 1 wherein said mount means includes an extensible scissors device comprised of a foldable strut and actuating arm, said arm being journaled to said strut, leaving a free end of said arm and a free end of said strut which can be pivoted towards one another, said free end of said free end of said arm being journaled to said frame, said free end of said strut being journaled to said cradle, so that the scissors unfold as the cradle is extended into contact with the ground, and is folded upon itself when the cradle is moved into a retracted position.

8. The apparatus of claim 7 wherein spaced extensible scissors are tied to a common transverse member, and a jack means is included for elevating the last said transverse member.

9. Apparatus by which a large, cylindrical bale of hay can be lifted and transported, comprising:
    an upwardly opening cradle of arcuate curvature in cross-sectional configuration, within which a large, cylindrical bale of hay can be received in supported and captured relationship therewithin:
    said cradle being fabricated from spaced members which are joined together to present an open framework which describes a segment of an elongated cylinder;

a main frame for supporting said cradle, said main frame having a forward end, a trailing end, and opposed sides;

a winch, a cable assembly, anchor means, means mounting said winch to said forward end of said main frame; said cable assembly having one marginal end thereof rove about said winch and the remaining end thereof attached to said anchor means;

means by which said cradle is pivotally journaled to said main frame such that the cradle is pivotally mounted with an over-the-center action so that when the cradle is retracted respective to the frame, the center of gravity thereof tends to force the cradle to remain in a retracted, upright position; and when the cradle is extended, a trailing marginal end thereof engages the ground;

said means mounting said cradle to said main frame includes apparatus by which said cradle can be moved from a location adjacent to said forward end of said main frame to a location adjacent to said trailing end of said main frame; whereby said cradle can be extended from the main frame into engagement with the ground, the cable rove about a bale of hay, and the winch employed to retract the cradle into a location adjacent said forward end of said main frame.

10. The apparatus of claim 9 wherein said anchor means includes spaced anchors affixed to said rear edge, said cable includes a bridle affixed to said anchors and a line leading to said winch.

11. The apparatus of claim 9 wherein said mount means includes spaced journals mounted to said trailing end of said main frame, means by which an arm is affixed to said cradle at a location spaced from the center of gravity thereof and to said spaced journals; a stop means for limiting the pivotal action of said cradle in a direction toward the forward end of said main frame;

whereby said cradle, as it pivots about said journal means, must be vertically raised and then lowered respective to said main frame.

12. The apparatus of claim 9 wherein said mount means includes an actuating arm, a strut, said strut having one end journaled to said cradle and another end journaled to said actuating arm, one end of said arm being journaled to said main frame; opposed ends of said arm and said strut move towards one another so as to fold together when said cradle is retracted, and fold apart when said cradle is extended respective to said frame, thereby moving said cradle from proximity of said trailing end towards a central overlying position respective to said main frame as said cradle is retracted.

13. The apparatus of claim 9 wherein said mount means includes an extensible scissors device comprised of a foldable strut and actuating arm, said arm being journaled to said strut, leaving a free end of said arm and a free end of said strut which can be pivoted towards one another, said free end of said arm being journaled to said frame, said free end of said strut being journaled to said cradle, so that the scissors unfold as the cradle is extended into contact with the ground, and is folded upon itself when the cradle is moved into a retracted position.

14. The apparatus of claim 13 wherein spaced extensible scissors are tied to a common transverse member, and a jack means is included for elevating the last said transverse member.

* * * * *